(12) United States Patent
Schnieder et al.

(10) Patent No.: US 9,097,118 B2
(45) Date of Patent: Aug. 4, 2015

(54) TRANSITIONAL REGION FOR A COMBUSTION CHAMBER OF A GAS TURBINE

(75) Inventors: Martin Schnieder, Ennetbaden (CH); Jörg Krückels, Birmenstorf (CH); Uwe Rüdel, Baden-Rütihof (CH); Christoph Appel, Umiken (CH); Urs Benz, Gipf-Oberfrick (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 961 days.

(21) Appl. No.: 13/226,020

(22) Filed: Sep. 6, 2011

(65) Prior Publication Data

US 2012/0060503 A1 Mar. 15, 2012

(30) Foreign Application Priority Data

Sep. 8, 2010 (EP) .................................... 10175744

(51) Int. Cl.
*F02C 7/24* (2006.01)
*F23R 3/04* (2006.01)
*F01D 9/02* (2006.01)
*F23R 3/00* (2006.01)

(52) U.S. Cl.
CPC . *F01D 9/023* (2013.01); *F02C 7/24* (2013.01); *F23R 3/002* (2013.01); *F23R 3/007* (2013.01); *F23R 2900/00005* (2013.01); *F23R 2900/03042* (2013.01); *Y02T 50/67* (2013.01); *Y02T 50/675* (2013.01)

(58) Field of Classification Search
CPC .......... F02C 7/24; F02C 7/28; F05D 2240/14; F05D 2240/15; F23R 3/002; F23R 3/60; F01D 9/023

USPC ............................ 60/796, 799–800, 752–760
See application file for complete search history.

(56) References Cited

U.S. PATENT DOCUMENTS

| 3,797,236 | A | * | 3/1974 | Hooke et al. .................... 60/796 |
| 4,016,718 | A | * | 4/1977 | Lauck .............................. 60/796 |
| 4,567,730 | A | * | 2/1986 | Scott ............................... 60/757 |
| 6,672,070 | B2 | | 1/2004 | Bland et al. |

(Continued)

FOREIGN PATENT DOCUMENTS

EP 1270874 A1 1/2003
EP 1391582 A2 2/2004

(Continued)

*Primary Examiner* — Andrew Nguyen
(74) *Attorney, Agent, or Firm* — Buchanan Ingersoll & Rooney PC

(57) ABSTRACT

A gas turbine including a combustion chamber and a first row of guide vanes, arranged essentially directly downstream thereof, of a turbine. The outer and/or inner limitation of the combustion chamber defined by at least one outer and/or inner heat shield, mounted on at least one combustion chamber structure arranged radially outside and/or inside. The hot gases flow path in the region of the guide vane row being restricted radially on the outside and/or inside by an outer and/or inner vane platform, mounted at least indirectly on at least one turbine carrier. A minimal gap size directly upstream of the first row of guide vanes is achieved by mounting at least indirectly on the turbine carrier at least one mini heat shield, arranged upstream of the first row of guide vanes and essentially adjacent the vane platform and in the flow direction between the heat shield and the vane platform.

18 Claims, 2 Drawing Sheets

(56) References Cited

U.S. PATENT DOCUMENTS

| | | |
|---|---|---|
| 2007/0245742 A1* | 10/2007 | Dahlke et al. .................. 60/754 |
| 2008/0104963 A1* | 5/2008 | Grote et al. .................... 60/753 |
| 2009/0188258 A1* | 7/2009 | Rizkalla et al. ................ 60/800 |
| 2009/0293488 A1 | 12/2009 | Coughlan, III et al. |
| 2010/0071377 A1* | 3/2010 | Fox et al. ....................... 60/740 |
| 2010/0146985 A1 | 6/2010 | Buchal et al. |
| 2010/0242485 A1* | 9/2010 | Davis et al. .................... 60/752 |

FOREIGN PATENT DOCUMENTS

| | | |
|---|---|---|
| EP | 1731715 A1 | 12/2006 |
| EP | 1767835 A1 | 3/2007 |
| EP | 2206885 A1 | 7/2010 |
| WO | 2009019282 A2 | 2/2009 |

* cited by examiner

TRANSITIONAL REGION FOR A COMBUSTION CHAMBER OF A GAS TURBINE

RELATED APPLICATIONS

The present application hereby claims priority under 35 U.S.C. Section 119 of European Patent application number 10175744.1 filed Sep. 8, 2010, the entire contents of which are hereby incorporated by reference.

FIELD OF INVENTION

The present invention concerns a gas turbine, in particular a special configuration of the transitional region between a combustion chamber and a turbine in a gas turbine.

BACKGROUND

Gas turbines may be configured with a single combustion chamber, but they may also have what is known as sequential combustion. In the case of the latter, fuel is burned in a first combustion chamber and then the combustion air is allowed to expand via a first turbine, a high-pressure turbine. Downstream of the high-pressure turbine, the still hot combustion gases flow through a secondary combustion chamber, in which fuel is additionally supplied and typically burned by spontaneous ignition. Arranged downstream of the secondary combustion chamber is a low-pressure turbine, through which the combustion gases are allowed to expand, possibly followed by a heat recovery system with steam generation.

The transition from combustion chamber to turbine is in this case a critical region, because particularly complex temperature and pressure conditions exist in this region. The combustion chamber, which is formed for example as an annular combustion chamber, typically has an as it were dish-shaped outer limitation, an outer wall, which consists of a heat-resistant material, or is correspondingly coated, and which is normally made up of individual segments. On the opposite, inner side, lying closer to the axis, there is a correspondingly formed inner limitation, an inner wall, of corresponding materials.

The turbine for its part has a number of alternately arranged rows of guide vanes and rotating blades. The first row of vanes, arranged directly downstream of the combustion chamber, is typically a row of guide vanes with considerable twisting of the vanes with respect to the direction of the main axis. The guide vanes are in this case typically formed as segment modules, in which each guide vane has on the inner side an inner platform and on the outer side an outer platform, and these platforms subsequently also limit with their inner surface the flow channel of the combustion air radially inward and radially outward. On the radially inner side of the annular flow channel there is correspondingly a gap between the inner combustion chamber heat shield (wall segment of the combustion chamber) and the inner platform of the first row of guide vanes, and on the radially outer side there is a gap between the outer combustion chamber heat shield (wall segment of the combustion chamber) and the outer platform of the first row of guide vanes.

It is known from US 2009/0293488, which is incorporated by reference, that it is possible to close this transitional region essentially by a gap of a very small size and additionally provide specific structures which ensure optimum cooling of the wall regions in this area. However, a problem of this approach is that the gap of a correspondingly small size also does not necessarily ensure the required play between the combustion chamber module and the turbine.

On account of the different mechanical and thermal loads on the components that are the combustion chamber and the turbine, however, this gap must have a certain width and cannot be simply closed or completely bridged.

In fact, the thermal expansion of the different components adjacent one another in this region (turbine, combustion chamber) is extremely different and, as a result of the size of the components, is also great in absolute terms. At the interfaces there are correspondingly large gaps, which must have sufficient gap widths over the entire transient stage (for example hot restarting). As a consequence, the gap width at the base-load point, for example, is and must be greater than is necessary for the operating state. Correspondingly, the problem also cannot be readily solved by reducing the gap width.

Furthermore, there are differences in the components and how they can be influenced by the flow processes. To be specific, in the combustion chamber there are only small differences in pressure, while in the region of the turbine there are great differences in pressure due to the vanes, which produce the pressure field. The pressure field acts on the gaps. The parts carrying hot gas outside the flow path must be protected from hot gas. Pressure peaks of the pressure field determine the pressure that must be available in the adjacent cavities. Leakage and higher RTDF (radial temperature distribution function)/emissions are the consequence. The purging of the cavities is actually determined by the pressure peaks occurring, and not by the average pressure.

A problem with this gap, which forms a cavity directed radially away from the hot gas channel and extending into further structural components of the housing, is therefore also the fact that it is additionally exposed to complex flow conditions, in particular in the region of each guide vane. To be specific, a so-called bow wave forms at the leading edge of the guide vanes and has the effect that hot combustion air in the wall region is forced under pressure into this cavity and penetrates into it to a corresponding depth. This can cause problems in connection with overheating, but also with oxidation of the corresponding surfaces.

Moreover, the bending moment loads on the vanes occur at the transitions between the platform and the profile. These bending moments in combination with the thermal stresses restrict the size of the platforms, and therefore the distance within which the gaps can be placed away from the profile stagnation points. In other words, the extents to which the platform can overhang are restricted.

SUMMARY

The present disclosure is directed to a gas turbine including at least one combustion chamber and a first row of guide vanes, arranged essentially directly downstream thereof, of a turbine. Radially outer and/or radially inner limitations of the combustion chamber are defined by at least one outer and/or inner heat shield, mounted on at least one combustion chamber structure arranged radially outside and/or radially inside. A flow path of hot gases in the region of the first row of guide vanes is restricted radially on the outside and/or radially on the inside by an outer and/or inner vane platform, mounted at least indirectly on at least one turbine carrier. At least one mini heat shield is mounted, at least indirectly, on the turbine carrier, arranged upstream of the first row of guide vanes and essentially adjacent the vane platform, and in the flow path direction between the heat shield and the vane platform, and forming a flow wall therebetween in the form of a shape adapted to the flow, with an upstream gap being present between the mini heat shield and the heat shield.

BRIEF DESCRIPTION OF THE DRAWINGS

Further embodiments of the invention are described below with reference to the drawings, which serve merely for explanation and should not be interpreted as restrictive. In the drawings.

DETAILED DESCRIPTION OF THE PREFERRED EMBODIMENTS

Introduction to the Embodiments

Figure 1:
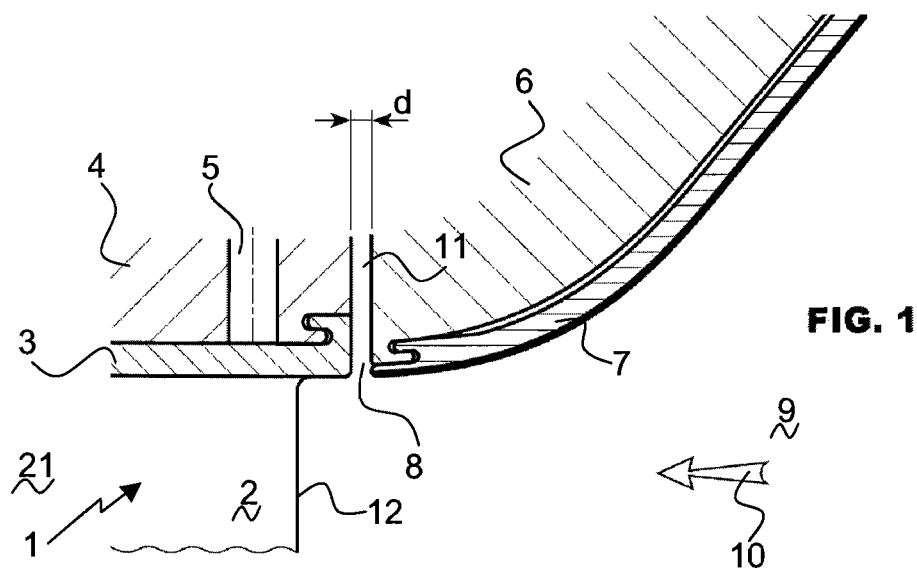
FIG. 1 shows a schematic axial section through the radially outer flow region at the exit of the combustion chamber, that is to say at the transitional region from the combustion chamber to the first row of guide vanes, in the case of a construction according to the prior art.

The present invention is intended to overcome the disadvantages explained at the beginning in connection with the gap just upstream of the first row of guide vanes, that is to say, at the transition from the combustion chamber to the first row of guide vanes. It is specifically concerned with improving a gas turbine with a combustion chamber and a first row of guide vanes arranged essentially directly downstream thereof, the radially outer and/or radially inner limitation of the combustion chamber being formed by at least one outer and/or inner heat shield (which forms the inner wall of the combustion chamber and typically takes the form of one or more plates with a thermal barrier coating; also referred to as a heat accumulation segment), which is mounted on at least one combustion chamber structure arranged radially outside and/or radially inside, and the flow path of the hot gases in the region of the row of guide vanes being restricted radially on the outside and/or radially on the inside by an outer and/or inner vane platform, which is mounted at least indirectly on at least one turbine carrier. In other words, in particular in the case of an annular combustion chamber, it is a matter of improving the construction either on the hub side (radially inner wall limitation of the combustion chamber) or on the outside (radially outer wall limitation of the combustion chamber), or both.

Since, in one exemplary embodiment, the heat shield is smaller than the heat shields of the combustion chamber, it is referred to hereafter as a mini heat shield, although this does not mean that the size of the mini heat shield is restricted.

By contrast with solutions aimed simply at reducing the size of the gap, reducing the entry of hot gas into the gap, or covering the gap, the present invention takes the path of relocating the gap entirely to a less critical location. The most critical location is, as explained above, where it is conventionally arranged, at the upstream end of the vane platform, this typically being made as short as possible to minimize stresses. Specifically at this end of the platform, the influence of the leading edge of the first row of guide vanes on the flow and pressure distribution is great, for which reason the aforementioned problems exist precisely in the region of the gap.

In accordance with the present invention, the procedure followed is that there is mounted at least indirectly on the turbine carrier at least one mini heat shield, arranged upstream of the first row of guide vanes and essentially adjacent the vane platform. Therefore, in the direction of flow, it lies between the heat shield of the combustion chamber (also known as the combustion chamber heat shield) and the vane platform. This mini heat shield bridges this region over a certain axial distance, it being shaped in such a way that it forms a flow wall adapted to the flow between the heat shield and the platform. The gap that is mentioned above and is required to compensate for the differences in thermal expansion between the combustion chamber and the turbine is consequently displaced as it were downstream and removed from the critical location directly at the leading edge of the first row of guide vanes, or at least relocated away from it.

In fact, this gap is relocated into a region further upstream between this mini heat shield and the heat shield in the form of an upstream gap.

In a first preferred embodiment of this configuration of a gas turbine, at least one of the mini heat shields is mounted on an extension of the turbine carrier extending upstream with respect to the direction of flow of the hot gases. In the case of this embodiment, the turbine carrier is therefore extended upstream, approximately in the axial direction, in comparison with the customary design, in order to be able to fix the mini heat shields to this extension. Since this extension is consequently a component part of the turbine, and is also exposed to the corresponding thermal expansion conditions, the size of the gap between the mini heat shield mounted on it and the adjacent vane platform can be set extremely small.

For reasons of assembly, it may be advantageous not to extend the turbine carrier upstream with respect to the original size, but to mount an additional element on the actual carrier. The procedure correspondingly followed, according to a further preferred embodiment, is that at least one of the mini heat shields is mounted on at least one additional turbine carrier element arranged upstream of the turbine carrier and mounted on it. In the case of this exemplary embodiment, the turbine carrier correspondingly does not have to be modified, but the mounting is ensured by way of a separate additional turbine carrier element which is mounted upstream on the turbine carrier. In other words, in this case the mini heat shield is not mounted on the turbine carrier directly but indirectly.

According to a preferred embodiment of the invention, a plurality of mini heat shields is arranged around the circumference of the wall of the combustion chamber. Typically essentially axially running gaps are then present between them. These gaps, separating the heat shields arranged adjacently around the circumference from one another, do not necessarily have to run axially in this case, but may also be adapted quite specifically to the direction of flow of the hot gases in this region. For example, these gaps may be arranged exactly parallel to the direction of flow of the hot gases in this region, which is often spiral in this region, but they may also be arranged perpendicularly thereto or at a certain preferred angle. In general, a device to apply a cooling air stream to these gaps may be provided, and/or seals may be provided in these gaps. Such gaps may as it were also be avoided, for example by the individual heat shields engaging in one another in the form of a groove/ridge connection, or the like.

In a further preferred embodiment, the contour of the annular space formed by the mini heat shields is not circular over its entire axial extent, but instead slight protuberances are provided locally, extending out from the circular shape normal to the direction of the stream of hot gas, in order to increase or reduce the static pressure locally, and consequently achieve an overall improvement in the uniformity of the static pressure distribution in the circumferential direction in the region of the gap. Such protuberances (bumps) for platforms of static turbine vanes are described in European patent application number EP 09159355.8, which is incorporated by reference.

In a further preferred embodiment, between the vane platform and the at least one mini heat shield there is a essentially peripheral gap with a small gap width, that is to say which preferably has a gap width in the axial direction in the range of 0.1-20 mm. For small industrial gas turbines and aeroderivatives, the gap width is typically 0.1 to 5 mm, for large gas turbines it is 0.5 to 20 mm. Typically, a gas turbine with an output of 50 MW is regarded as a large gas turbine. Here, too, a device to apply a stream of cooling air to this peripheral gap may preferably be provided, and/or seals, for example labyrinth seals, or even inter-engagement with the vane platform may be provided.

To ensure sufficient removal from the critical leading edge of the first row of guide vanes, the procedure preferably followed is that the mini heat shield has in the axial direction a length in the range of 5 to 500 mm. For small industrial gas turbines and aeroderivatives, the length is typically 5 to 50 mm, for large gas turbines it is 10 to 350 mm. For future very large gas turbines, lengths of up to 500 mm are conceivable. In other words, the very wide gaps in the construction according to the prior art are relocated upstream by approximately this distance.

The critical gap according to the prior art typically lies in a region in which the wall for the flow gases is arranged essentially cylindrically.

The upstream gap may then typically be arranged at a point at which the wall of the combustion chamber is arranged conically tapering further upstream, seen in the direction of flow, and thereby preferably has a gap size in the radial direction in the range of 1-200 mm. For small industrial gas turbines and so-called aeroderivatives (aeroengine adopted and modified for industrial purposes), the gap width is typically 0.1 to 5 mm; for large gas turbines it is 0.5 to 15 mm and for very large gas turbines it may be 20 mm or more.

In a further preferred embodiment, a device to apply cooling air to the upstream gap, and in particular a cavity arranged behind it, is provided. In this case there may also be arranged in the entry region of such a cavity at least one step element, which reduces the width of the cavity by at least 10% in at least one step running essentially perpendicularly to the direction of flow of the hot gas in the cavity, such a step element preferably being formed peripherally with respect to the axis of the turbine.

It is possible to design the entire construction in such a way that one mini heat shield per burner is arranged in the combustion chamber; it is also possible, for example, to arrange two or three heat shields per burner, or a shared heat shield respectively for two burners or three burners. Typically, the number of combustion chamber heat shields is chosen as an integral multiple of the number of mini heat shields or the number of mini heat shields is chosen as an integral multiple of the number of combustion chamber heat shields. For example, in the case of a gas turbine of the type GT 24 with sequential combustion, 24 burners are arranged around the circumference of the annular combustion chamber, so in the case of such a design it may have 24 mini heat shields arranged distributed around the circumference, that is to say one heat shield per burner, or 12, so that two burners respectively share a heat shield, or 48, if two mini heat shields are respectively provided per burner.

Typically, there are many more guide vanes in the first row of guide vanes of the turbine than there are burners. An adaptation of the number of heat shields to the circumstances of the first row of guide vanes is also possible. It is correspondingly possible that one mini heat shield is respectively arranged per guide vane of the first row of guide vanes in the combustion chamber. It is likewise possible that two guide vanes respectively have a common heat shield upstream.

Typically, the number of guide vanes of the first row of guide vanes is chosen as an integral multiple of the number of mini heat shields or the number of mini heat shields is chosen as an integral multiple of the number of guide vanes of the first row of guide vanes.

Whether the number thereof is provided on the basis of the burners or on the basis of the guide vanes, these heat shields may either be arranged precisely staggered or they are preferably arranged such that the gaps present between the heat shields are arranged between two adjacent burners or between two adjacent guide vanes respectively, since then these gaps that are present between the heat shields are subjected to the least loading.

The mini heat shields are typically formed as individual, essentially plate-shaped heat accumulation elements that are adapted to the form of flow and are mounted by way of positively and/or non-positively connecting and/or material-bonders on the turbine carrier and/or on an additional turbine carrier element mounted on the turbine carrier.

At least on the side facing the hot gases flowing in the combustion chamber, the heat shields usually have a thermal barrier coating, which is for example a ceramic layer.

The upstream gap typically goes over on the rear side, facing away from the combustion chamber, into a cavity, and this cavity may then extend for example in the essentially axial direction, thus for example in the form of a peripheral gap running essentially around the axis of the gas turbine and forming a cylindrical enclosure.

It is alternatively possible that the upstream gap goes over on the rear side, facing away from the combustion chamber, into a cavity, and that this cavity extends essentially in the radial direction, thus, for example, in the form of a peripheral gap running essentially around the axis of the gas turbine and forming a circular disk. However, it is also possible that the gap runs in a direction between these two directions (axially/radially).

DETAILED DESCRIPTION

There follows an explanation on the basis of the figures of how the transitional region between the combustion chamber and the first row of guide vanes can preferably be configured. In connection with the figures that are now discussed, only the situation on the radial outside is presented in each case; however, the thoughts expressed here also apply entirely analogously to the radial inside, i.e. to the hub-side wall limitation at the transition of the combustion chamber to the first row of guide vanes.

FIG. 1 firstly shows the transitional region of the wall of the combustion chamber 9 to the first row of guide vanes 1 of the turbine 21 in the case of a design according to the prior art. The first row of guide vanes 1 is formed typically by individual vane airfoils 2 in each case, which have vane platforms 3 radially on the outside and radially on the inside. By way of these vane platforms, which for their part form an as it were peripheral closed ring that limits the flow cross section radially outward, the row of guide vanes 1 is mounted on a turbine carrier 4. Since high temperatures prevail here, there is a corresponding cooling air feed 5, possibly opening out into corresponding cooling air channels in the platforms 3 and/or the airfoils 2.

Upstream of this first row of guide vanes 1 is the combustion chamber 9 and this is typically limited by way of one or more heat shields 7, which are mounted on a combustion chamber structure 6. These heat shields 7 typically take the form of plates and have, on the side exposed to the hot gases, thermal barrier coatings.

As schematically indicated by the arrow 10, the hot gases flow in an essentially axial direction downstream of the burners, which are not represented in FIG. 1 and lie on the right-hand side of the region represented. These hot gases impinge inter alia on the leading edge 12 of the airfoils 2. However, the transition between the heat shield 7 and the platform 3 is specifically in this region; arranged in this transitional region is a peripheral gap 8, which opens out behind it into a cavity 11, which extends deep into the carrying structure of the turbine carrier 4 and/or of the combustion chamber structure 6. This gap is required because of the effects mentioned at the beginning and typically lies with a gap size d in the range of 10 to 50 mm. If the gap is chosen narrower, it is no longer possible to compensate sufficiently for different thermal expansions of the components that are the combustion chamber/turbine and for other effects. Correspondingly, a great effort in terms of cooling and/or purging the cooling air is also required in the region of this gap, and also under high pressure, since the components lying in the cavity 11 have to be protected from the hot flow gases and since there are, however, at the same time high pressure fluctuations, and in particular high pressure peaks, at this very point.

Figure 2:
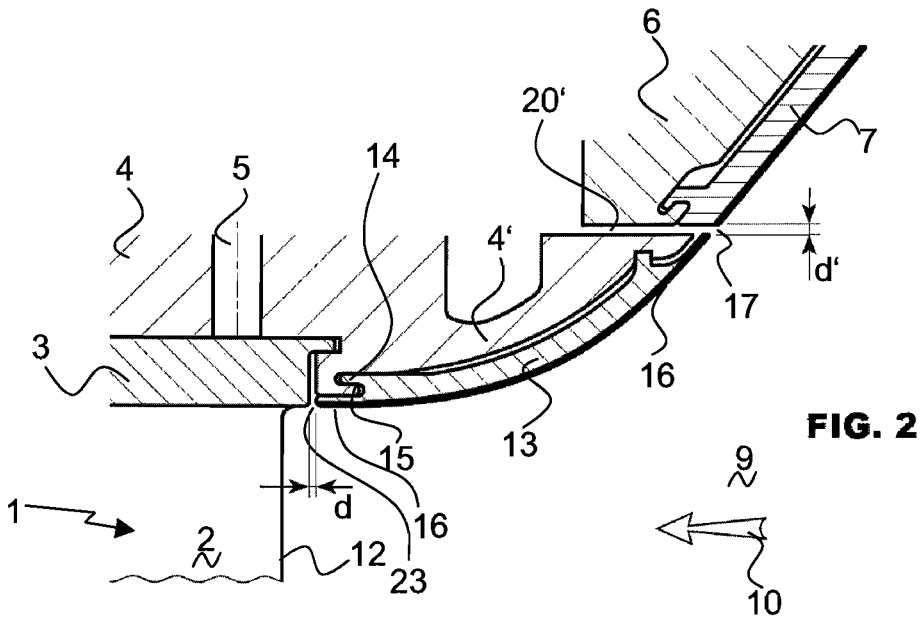
FIG. 2 shows a schematic axial section through the radially outer flow region at the exit of the combustion chamber in the case of a design according to a first exemplary embodiment according to the invention.

FIG. 2 then shows a first exemplary embodiment of the invention. An intermediate element in the form of a mini heat shield 13 is now interposed between the heat shield 7 and the first vane platform 3 of the first row of guide vanes 1. This heat shield 13 is, in this case, mounted on directly on an upstream extension 4' of the turbine carrier 4. The shields are, as it were, mini heat shields, which are arranged distributed around the circumference of the annular combustion chamber. As represented in this figure, these mini heat shields 13 may, in this case, be realized on the side of the row of guide vanes 1 by way of a connection comprising a mounting projection 14 and a retaining lug 15, and a shroud region 16 arranged thereover, but other mounting possibilities can also be realized. The fact that this additional heat shield is mounted directly on the same carrying element, i.e. to the turbine carrier 4, and correspondingly is subjected to essentially the same conditions as the vane platform 3, both in terms of vibrations and in terms of thermal expansion etc., means that it is now possible to make the corresponding gap size d of the remaining gap 23 between the vane platform 3 of the heat shield 13 extremely small; thus, for example, gap sizes in the axial direction of 0.5-3 mm are possible here without any problems occurring as a result.

The gap 17 between the heat shield 7 and the heat shield 13 is then relocated much further upstream; to be specific, the upstream gap 17 is now also arranged at the extended wall zone of the combustion chamber 9. Moreover, the cavity 20 arranged behind this upstream gap 17 no longer runs in the radial direction, as according to the prior art, but as an axial cavity 20' in the axial direction 25, which may have further advantages, in particular that this gap can be realized with a gap size d' that is much smaller than the gap size when the corresponding gap runs as it were in the radial direction, as represented for example in FIG. 1.

Figure 3:
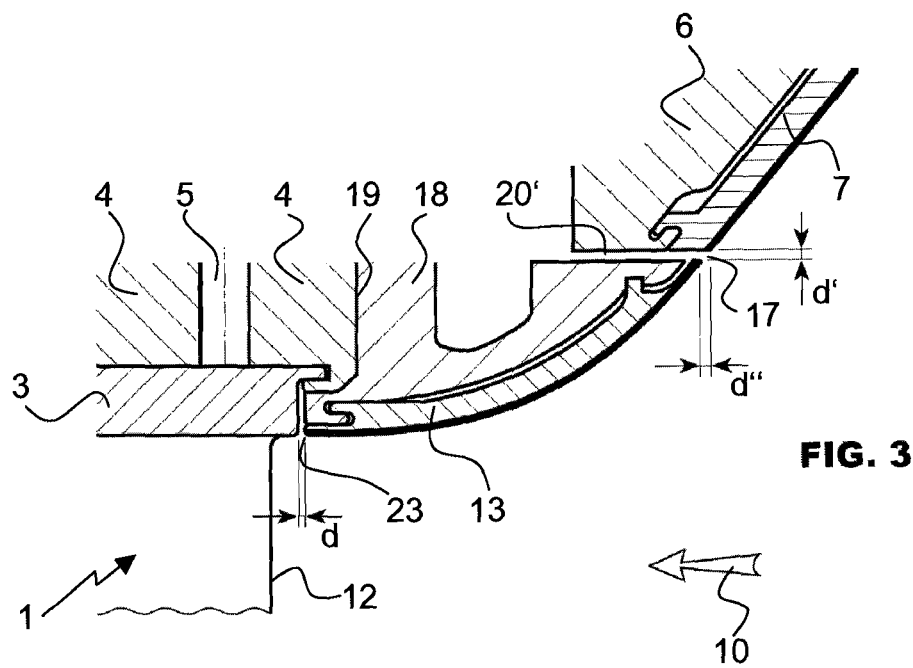
FIG. 3 shows a schematic axial section through the radially outer flow region at the exit of the combustion chamber in the case of a design according to a second exemplary embodiment according to the invention.
Figure 4:
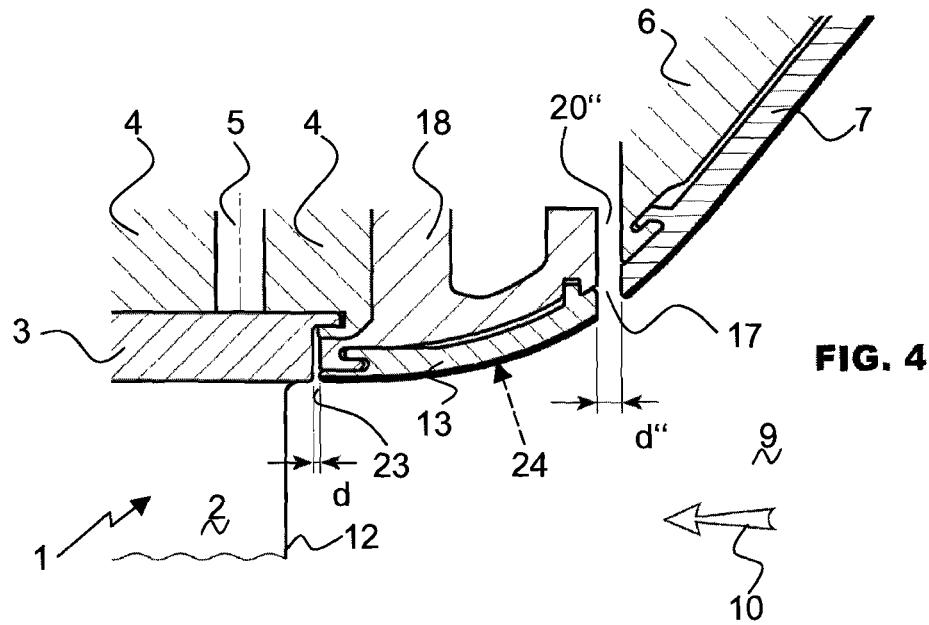
FIG. 4 shows a schematic axial section through the radially outer flow region at the exit of the combustion chamber in the case of a design according to a third exemplary embodiment according to the invention.

A second exemplary embodiment is represented in FIG. 3. A major difference from the design according to FIG. 2 (in the figures as a whole, components that are the same or functionally equivalent are denoted in each case by the same designations) is that the turbine carrier 4 does not have an upstream extension 4', but instead has an additional turbine carrier element 18 extending upstream. This separate turbine carrier element 18 is mounted on the turbine carrier 4, which may take place by way of a positive connection and/or a non-positive connection and/or a material bond, for example on the front side 19 of the turbine carrier. In principle, this additional turbine carrier element 18 undertakes the same function as the upstream extension of the turbine carrier. For reasons of assembly, however, it may be advantageous not to extend the turbine carrier in the upstream direction with respect to the original size, but to mount an additional element, here indeed the additional turbine carrier element 18, on the actual turbine carrier 4. A third exemplary embodiment is represented in FIG. 4. Here, the additional mini heat shield 13 is likewise mounted on the turbine carrier 4 indirectly by way of an additional turbine carrier element 18. What is more, it is possible in principle, both in connection with the construction that is shown in FIG. 3 and with FIG. 4, for the additional turbine carrier element 18 to be configured in the form of a peripheral ring; however, it may also comprise segments, which in this case do not even have to be peripherally adjacent one another, but may also be arranged, for example, such that they are distributed spaced apart around the circumference of the annular combustion chamber. By contrast with the exemplary embodiment that is shown in FIG. 3, in the case of the embodiment that is shown in FIG. 4 the upstream gap 17 is somewhat less far upstream and, moreover, the gap 17 and/or the cavity 20 behind it does not run in the axial direction here, but as a radial cavity 20" in the radial direction.

The individual mini heat shields are in this case distributed in the form of segments as it were around the circumference of the annular combustion chamber. As explained above, the number of such heat shields may be chosen either on the basis of the number of burners, of the number of combustion chamber heat shields or on the basis of the number of guide vanes 2. Between the individual heat shields and/or the segments of such heat shields there generally remain axially running gaps 24, which are schematically indicated in FIG. 4 by a dashed arrow. As well as possibly the gaps 17 and 23, cooling air is preferably applied to these axially running gaps 24, or they are provided with seals, for example labyrinth seals, in order to protect components lying behind them. As a result of the smaller gap sizes, lower pressures are generally required in this case for the purging air and/or cooling air. Moreover, on account of the segmental formation of the individual mini heat shields, it is also possible to resort to local handling of the pressure peaks. In general, the design makes it possible to build turbines that are more compact.

| LIST OF DESIGNATIONS | |
|---|---|
| 1 | first row of guide vanes |
| 2 | first row of guide vanes, airfoil |
| 3 | first row of guide vanes, vane platform |
| 4 | turbine carrier (or turbine guide vane carrier) |
| 4' | upstream extension of the turbine carrier |
| 5 | cooling air feed |
| 6 | combustion chamber structure (suspension on the combustion chamber housing) |
| 7 | combustion chamber heat shield (heat shield of the combustion chamber) |

-continued

LIST OF DESIGNATIONS

| | |
|---|---|
| 8 | gap at the vane platform |
| 9 | combustion chamber |
| 10 | direction of flow of the hot gases |
| 11 | cavity behind 8 |
| 12 | leading edge |
| 13 | mini heat shield, separate heat shield |
| 14 | mounting projection |
| 15 | retaining lug |
| 16 | shroud region |
| 17 | gap at the upstream point |
| 18 | additional turbine carrier element |
| 19 | front side of 4 |
| 20 | cavity behind 17 |
| 20' | axial cavity |
| 20" | radial cavity |
| 21 | turbine |
| 22 | gas turbine |
| 23 | gap between 3 and 13 |
| 24 | axially running gap between adjacent heat shields distributed over the circumference |
| 25 | axial direction |
| 26 | radial direction |
| d | gap size at vane platform |
| d' | gap size at the upstream gap 17 in the radial direction |
| d" | gap size at the upstream gap 17 in the axial direction |

What is claimed is:

1. A gas turbine (22) comprising:
at least one combustion chamber (9) and a first row of guide vanes (2) arranged directly downstream of the combustion chamber, wherein at least one of radially outer and radially inner limitations of the combustion chamber (9) being defined by a respective outer or inner heat shield (7), which is mounted on at least one combustion chamber structure (6) arranged at least one of radially outside and radially inside, respectively, of the at least one combustion chamber structure; a flow path of hot gases (10) in a region of the first row of guide vanes (2) being restricted radially on the outside and/or radially on the inside by an outer and/or inner vane platform (3), which is mounted at least indirectly on at least one turbine carrier (4);
at least one mini heat shield (13) is mounted at least indirectly on the at least one turbine carrier (4), arranged upstream of the first row of guide vanes (2) and essentially adjacent the outer and/or inner vane platform (3), and in the flow path direction (10) between the respective outer and/or inner heat shield (7) and the outer and/or inner vane platform (3), and forming a flow wall therebetween in the form of a shape adapted to the flow, with an upstream gap (17) disposed between the at least one mini heat shield (13) and the respective outer and/or inner heat shield (7), wherein the upstream gap (17) extends directly between and separates the turbine carrier (4, 18) and the combustion chamber structure (6).

2. The gas turbine (22) as claimed in claim 1, wherein the at least one mini heat shield includes a plurality of mini heat shields and at least one of the mini heat shields (13) is mounted on an extension (4') of the at least one turbine carrier (4) extending upstream with respect to the direction of flow (10) of the hot gases.

3. The gas turbine (22) as claimed in claim 1, wherein the at least one mini heat shield includes a plurality of mini heat shields and at least one of the mini heat shields (13) is mounted on at least one additional turbine carrier element (18), arranged upstream of, and mounted, on the at least one turbine carrier (4).

4. The gas turbine (22) as claimed in claim 1, wherein a plurality of mini heat shields (13) are arranged around a circumference of a wall of the combustion chamber (9) having essentially axially running gaps (24) between them, or gaps running essentially in the main direction of flow (10), while a device that applies a cooling air stream to said gaps is provided, and/or seals are provided in these gaps (24).

5. The gas turbine (22) as claimed in claim 1, further comprising a peripheral gap (23) between the outer and/or inner vane platform (3) and the at least one mini heat shield (13), which has a gap width (d), in an axial direction, in the range of 1-5 mm, and a device that applies a cooling air stream to said peripheral gap (23).

6. The gas turbine (22) as claimed in claim 1, further comprising a peripheral gap (23) between the outer and/or inner vane platform (3) and the at least one mini heat shield (13), which has a gap width (d), in an axial direction, in the range of 2-4 mm, and a device that applies a cooling air stream to said peripheral gap (23).

7. The gas turbine (22) as claimed in claim 1, wherein the at least one mini heat shield (13) has, in an axial direction (25), a length in the range of 5-500 mm.

8. The gas turbine (22) as claimed in claim 1, wherein the at least one mini heat shield (13) has, in an axial direction (25), a length in the range of 10-350 mm.

9. The gas turbine (22) as claimed in claim 1, wherein the upstream gap (17) is arranged at a point at which a wall of the combustion chamber is arranged conically tapering, and a gap size (d') thereof in a radial direction (26) is in the range of 0.1-20 mm, and/or a gap size (d") thereof in an axial direction (25) is in the range of 0.1-20 mm.

10. The gas turbine (22) as claimed in claim 1, wherein the upstream gap (17) is arranged at a point at which a wall of the combustion chamber is arranged conically tapering, and a gap size (d') thereof in a radial direction (26) is in the range of 0.5-20 mm, and/or the gap size (d") thereof in an axial direction (25) is in a range of 0.5-20 mm.

11. The gas turbine (22) as claimed in claim 1, further comprising a device that applies cooling air to the upstream gap (17), and in particular a cavity (20) arranged behind the upstream gap; and
at least one step element, arranged in an entry region of said cavity, which reduces a width of the cavity by at least 10% in at least one step running essentially perpendicularly to the direction of flow of the hot gas in the cavity (20), said element being formed peripherally with respect to the axis of the turbine.

12. The gas turbine (22) as claimed in claim 1, wherein the number of combustion chamber heat shields (7) is an integral multiple of a number of the at least one mini heat shield (13) or the number of the at least one mini heat shield (13) is an integral multiple of the number of combustion chamber heat shields (7).

13. The gas turbine (22) as claimed in claim 1, wherein a number of the at least one mini heat shield (13) is an integral multiple of the number of guide vanes (2) of the first row of guide vanes (13) or the number of guide vanes (2) of the first row of guide vanes is an integral multiple of the number of the at least one mini heat shield (13).

14. The gas turbine (22) as claimed in claim 2, wherein the mini heat shields (13) are formed as individual heat accumulation elements that are adapted to a form of flow and are mounted by way of positively and/or non-positively connecting and/or material-bonder on the turbine carrier (4') and/or on an additional turbine carrier element (18) mounted on the turbine carrier (4).

15. The gas turbine (22) as claimed in claim 14, wherein at least on a side facing the hot gases flowing in the combustion chamber, the mini heat shields (13) comprise a thermal barrier coating.

16. The gas turbine (22) as claimed in claim 1, wherein the upstream gap (17) extends on a rear side, facing away from the combustion chamber (9), into a cavity (20), the cavity (20) extends essentially in a radial direction (25), in the form of a peripheral gap (20') running essentially around an axis of the gas turbine (22) and forming a cylindrical enclosure.

17. The gas turbine as claimed in claim 1, wherein a contour of an annular space formed by the at least one mini heat shield (13) is not circular over its entire axial extent, but instead slight protuberances are provided locally, extending out from a circular shape normal to the direction of the flow of hot gas (10), in order to locally increase or reduce static pressure, thereby achieving an overall improvement in uniformity of static pressure distribution in a circumferential direction in a region of the upstream gap (17).

18. The gas turbine as claimed in claim 1, wherein the upstream gap (17) goes over on a rear side, facing away from the combustion chamber (9), into a cavity (20), the cavity (20) extends essentially in a radial direction (26), in the form of a peripheral gap (20") running essentially around the axis of the gas turbine (22) and forming a circular disk.

* * * * *